(12) United States Patent
Khan et al.

(10) Patent No.: US 12,476,539 B2
(45) Date of Patent: Nov. 18, 2025

(54) CONTROL OF AUXILIARY-ASSISTED DC-DC CONVERTER

(71) Applicant: NXP USA, Inc., Austin, TX (US)

(72) Inventors: Nameer Ahmed Khan, Toronto (CA); Olivier Trescases, Toronto (CA); John Pigott, Phoenix, AZ (US); Hendrik Johannes Bergveld, Eindhoven (NL); Gerard Villar Piqué, Eindhoven (NL); Alaa Eldin Y El Sherif, Plano, TX (US)

(73) Assignee: NXP USA, Inc., Austin, TX (US)

( * ) Notice: Subject to any disclaimer, the term of this patent is extended or adjusted under 35 U.S.C. 154(b) by 292 days.

(21) Appl. No.: 18/193,454

(22) Filed: Mar. 30, 2023

(65) Prior Publication Data

US 2023/0318454 A1  Oct. 5, 2023

(30) Foreign Application Priority Data

Mar. 31, 2022 (EP) .................................... 22165882

(51) Int. Cl.
*H02M 3/157* (2006.01)
*H02M 3/158* (2006.01)

(52) U.S. Cl.
CPC ........... *H02M 3/157* (2013.01); *H02M 3/158* (2013.01)

(58) Field of Classification Search
CPC .... H02M 3/157; H02M 3/158; H02M 1/0025; H02M 1/0095
See application file for complete search history.

(56) References Cited

U.S. PATENT DOCUMENTS

| 8,441,242 | B2 | 5/2013 | Ng et al. |
| 10,033,301 | B2 | 7/2018 | Zhang et al. |
| 2011/0298439 | A1* | 12/2011 | Ng ..................... H02M 3/1584 323/283 |
| 2012/0182049 | A1 | 7/2012 | Garbossa et al. |

(Continued)

OTHER PUBLICATIONS

Chen, Chen et al.; "A 92.7%-Efficiency 30A 48V-to-1V Dual-Path Hybrid Dickson Converter for PoL Applications"; 2021 IEEE Energy Conversion Congress and Exposition, Oct. 2021, pp. 1989-1994.

(Continued)

*Primary Examiner* — Sean Kayes
*Assistant Examiner* — Afework S Demisse

(57) ABSTRACT

Disclosed are a controller and power converter having a main buck converter connected between a first input voltage and ground and having a main output, a bidirectional auxiliary converter connected between a second terminal and ground and having an auxiliary output connected to the main output, an output capacitor, and an auxiliary capacitor connected between the second terminal and the ground for providing a second terminal voltage at the second terminal; the controller comprising: first control circuit configured to operate the main converter at a first frequency; and second control circuit configured to operate the auxiliary converter at a higher frequency; the first control circuit being further configured to operate the main converter in dependence on the second terminal voltage; and the second control circuit being further configured to operate the auxiliary converter to control the voltage at the main output terminal.

18 Claims, 9 Drawing Sheets

(56) References Cited

U.S. PATENT DOCUMENTS

2015/0002115 A1    1/2015  Shenoy et al.
2017/0310205 A1*  10/2017  Coleman ................. H02M 1/15

OTHER PUBLICATIONS

EP Application No. 22165872.7, Khan, Nameer Ahmed: "Control of Two-Stage DC-DC Converter", filed Mar. 31, 2022.

Khan, Nameer et al.; "A Wide-Input-Voltage-Range 50W Series-Capacitor Buck Converter with Ancillary Voltage Bus for Fast Transient Response in 48V PoL Applications"; 2022 24th European Conference on Power Electronics and Applications; Sep. 2022; 8 pages.

Seo, Gab-Su et al.; "A 95%-Efficient 48V-to-1V/10A VRM Hybrid Converter Using Interleaved Dual Inductors", 2018 IEEE Energy Conversion Congress and Exposition; Sep. 2018; pp. 3825-3830.

Shan, Zhenyu et al.; "Transient Mitigation of DC-DC Converters for High Output Current Slew Rate Applications"; IEEE Transactions on Power Electronics; vol. 28, No. 5; pp. 2377-2388; May 2013.

Pan, Shangzhi et al.; "A New Digital Adaptive Voltage Positioning Technique with Dynamically Varying Voltage and Current References"; IEEE Transactions on Power Electronics, vol. 24, No. 11 Nov. 2009; 13 pages.

Cao, Haixiao et al.; "A 12-Level Series-Capacitor 48-1V DC-DC Converter With On-Chip Switch and GaN Hybrid Power Conversion"; IEEE Journal of Solid-State Circuits; vol. 56, No. 12; Dec. 2021; 11 pages.

Vekslender, Timur et al.; "Fully-Integrated Digital Average Current-Mode Control 12V-to-1.xV Voltage Regulator Module IC"; 2017 IEEE Applied Power Electronics Conference and Exposition; Mar. 2017; 8 pages.

Xie, Tianshi et al; "Multiphase Control for Robust and Complete Soft-charging Operation of Dual Inductor Hybrid Converter"; 2019 IEEE Applied Power Electronics Conference and Exposition; Mar. 2019; 5 pages.

Chen, Yenan et al.; "A 93.7 % Efficient 400A 48V-1V Merged-Two-Stage Hybrid Switched-Capacitor Converter with 24V Virtual Intermediate Bus and Coupled Inductors"; 2021 IEEE Applied Power Electronics Conference and Exposition; Jun. 2021 ; 8 pages.

* cited by examiner

Fig. 1: PRIOR ART

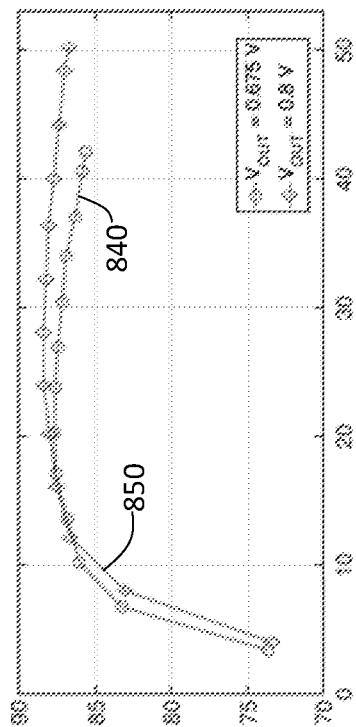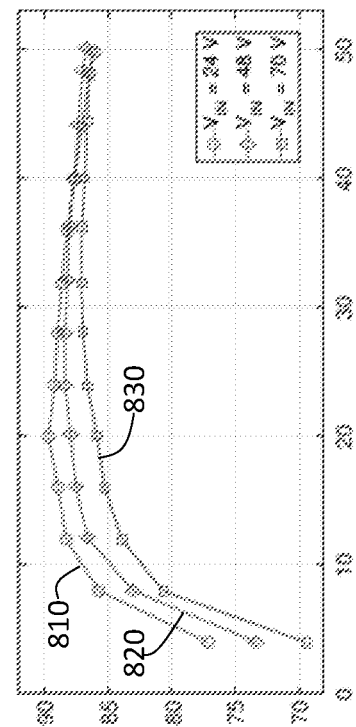
Fig. 8

CONTROL OF AUXILIARY-ASSISTED DC-DC CONVERTER

CROSS-REFERENCE TO RELATED APPLICATIONS

This application claims the priority under 35 U.S.C. § 119 of European Patent application no. 22165882.6, filed on 31 Mar. 2022, the contents of which are incorporated by reference herein.

FIELD

The present disclosure relates to DC-DC converters and controllers and method of controlling DC-DC converters and in particular to converters having a main converter for providing the DC power at the output, together with auxiliary converter for regulating transient power delivery.

BACKGROUND

A DC-DC converter normally includes a smoothing, or decoupling, capacitor across its output. In recent years, stringent transient requirements of Central-Processing-Unit (CPU) core voltages (0.8V-1.2V) have been met with large, costly electrolytic decoupling capacitors, presenting a challenge for applications which are cost-constrained or volume-constrained, such as automotive Electronic-Control-Unit (ECU) applications. Meanwhile, the proliferation of on-board electronics has resulted in a shift towards 48-V voltage-distribution networks. Both trends necessitate an efficient Point-of-Load (PoL) converter that can meet the power demands, in the order of 50 W, of automotive processors, from a wide-ranging bus voltage, which can typically be in the order of 24V-54V for automotive application. Hybrid converter topologies, used to enable converting a high input voltage to a low output voltage without the need of a transformer, and Gallium-Nitride (GaN) devices have enabled efficient 48-V PoL converters, however, fast transient response remains a challenge.

To improve transient response, control schemes employing low-cost auxiliary converters have been proposed where the auxiliary stage provides and absorbs charge during load transients, while the DC-DC main stage delivers the steady-state and slowly changing load power, thereby reducing decoupling capacitance requirements. However, in most prior-art systems, the auxiliary converter is supplied by the same input voltage as the main converter. Especially for high-input-voltage DC-DC converters, this requires the same voltage rating to be applied for the power switches in both the main and the auxiliary converter. Due to the high voltage rating, the required Figure of Merit (FOM) of these switches ($R_{on}*Q_g$) tends to reduce the operating efficiency of the auxiliary converter, especially since it is generally required to switch relatively fast to enable a fast response to voltage transients at the converter output. Cost is also concern for the PoL converters, as is the transient response. A PoL which can, at least partially, address one or more of the above issues is desirable.

SUMMARY

According to a first aspect of the present disclosure, there is provided a controller for a power converter having a main buck converter connected between a first input voltage and a ground and having a main output at an output terminal, a bidirectional auxiliary converter connected between a second terminal and the ground and having an auxiliary output connected to the main output terminal, an output capacitor connected between the main output terminal and the ground, and an auxiliary capacitor connected between the second terminal and the ground and for providing a second terminal voltage at the second terminal; the controller comprising: a first control circuit configured to operate the main converter at a first frequency, a second control circuit configured to operate the auxiliary converter at a second frequency which is higher than the first frequency; the first control circuit being further configured to operate the main converter in dependence on the second terminal voltage; and the second control circuit being further configured to operate the auxiliary converter to control the voltage at the main output terminal. Such a converter may therefore not require the auxiliary converter to use high-voltage components, which may thereby enable use of cheaper, lower-voltage transistors in particular thereby reducing the bill-of-materials (BOM) cost. By providing the auxiliary capacitor as energy reservoir for the auxiliary converter, there may be no requirement for an additional auxiliary power supply. Greater voltage excursions on the capacitor may facilitate faster transient response. This may be further enhanced facilitated by the cross-coupled control in which the main converter regulates the voltage at the auxiliary capacitor, and the auxiliary converter regulates the voltage at the output. As mentioned, the auxiliary capacitor provides a second terminal voltage at the second terminal. In other words, it stores a replenishable reservoir of electrical charge which may be increased (thereby increasing the second terminal voltage) or decreased (thereby decreasing the second terminal voltage) by the operation of the bidirectional auxiliary converter in opposite directions.

According to one or more embodiments the bidirectional auxiliary converter comprises a pair of switches connected in series between the second terminal voltage and the ground and having a node therebetween, and an inductor connected between the node and the output terminal. A half-bridge converter such as that mentioned above may be particularly convenient and inexpensive with a low BOM. The controller may be configured to control the second terminal voltage within a range of +4.5 to +5.5 V, or even a larger range of e.g. +3 to +6V, which choice depends on the system requirements, e.g. the range may have to be chosen +4.5V to +5.5V when other circuitry is supplied from this voltage as well. In general, such an excursion may be much wider than could be tolerated, in many applications, on the output voltage.

According to one or more embodiments the first control circuit is configured to: determine an error between the voltage at the second terminal ($V_{AUX,SENSED}$) and a reference auxiliary voltage ($V_{AUX,REF}$), and control switches in the main converter to minimise the error. The first control circuit may comprise a one of a proportional-integral, PI, circuit and a proportional-integral-derivative, PID, circuit; furthermore, the first control circuit may be configured to determine the error, by subtracting a digitised version of the voltage at the second terminal ($V_{AUX,SENSED}$) from a digital representation of the reference auxiliary voltage ($V_{AUX,REF}$), and processing the result of the subtraction in the one of the PI circuit and the PID circuit to determine the error.

According to one or more embodiments the second control circuit comprises a proportional-integral, PI, circuit. A PI circuit may be simpler and faster to respond than an alternative error integration circuit. However, in other embodiments other error integration circuit such as a PID circuit may be used.

According to one or more embodiments the second control circuit comprises a constant on-time, COT, controller. COT control is a particularly convenient and straightforward control method, which may minimise the complexity of the control circuitry. However, in other embodiments different control circuits and control schemes may be used for the second control circuit.

According to one or more embodiments the second control circuit is configured to compare the voltage at the main output terminal with a reference voltage. According to one or more such embodiments the second control circuit is further configured to adapt the reference voltage in dependence on an output current supplied at the main output terminal. By applying AVP, the initial set point of $V_{AUX}$ can be adjusted, and that creates more voltage headroom for the transient, (since, for a given possible polarity of current step, the voltage on $C_{AUX}$ is positioned so that its excursion is in the direction away from the limits of the $C_{AUX}$ voltage. In other words, if the load current is high, one can preposition $C_{AUX}$ towards the system (and in particular the auxiliary converter) lower operating voltage limit. As a result, $C_{AUX}$ can absorb more charge (energy) and still not exceed the upper V limit. Conversely for starting from low load current, preposition $C_{AUX}$ towards the auxiliary converter's upper operating voltage limit, enable it to supply more charge without dropping below the lower operating limit. Moreover, such a larger voltage excursion allows a reduction the BoM for the same transient response (since it allows for a "better" use of the capacitance $C_{AUX}$ compared with only having $C_{OUT}$ at a low voltage).

According to one or more embodiments, the first control circuit controls switches in the main circuit to increase the second terminal voltage, in response to the second control circuit controlling the switches in the auxiliary converter to transfer charge out of the auxiliary capacitor. Moreover, according to one or more embodiments the first control circuit controls switches in the main circuit to decrease the second terminal voltage, in response to the second control circuit controlling the switches in the auxiliary converter to transfer charge into the auxiliary capacitor. Thus, as will be discussed in detail, the two control circuits are effectively "cross-coupled".

According to one or more embodiments the main converter is a series-capacitor buck converter.

According to a second aspect of the present disclosure, there is provided a power converter comprising a controller, a main converter and an auxiliary converter as defined above.

According to one or more embodiments, the second terminal voltage is no more 5V. Using a low voltage for the auxiliary converter may enable a low BOM.

According to one or more embodiments the main converter is controllable to provide a required power up to a first power level, and the auxiliary converter is controllable to each of supply and absorb a second power level, which is no more than the first power level, in response to a change in the required power. The average power requirements on the auxiliary converter may thus be kept to a relatively low value, and in practical applications even the instantaneous power (which may far exceed the average power, in some applications) will rarely exceed one half of the power of the main converter which may facilitate use of inexpensive components and a low BOM.

According to a further aspect of the present disclosure, there is provided a method of controlling a power converter having a main buck converter connected between a first input voltage and a ground and having a main output at an output terminal, a bidirectional auxiliary converter connected between a second terminal and the ground and having an auxiliary output to the main output terminal, an output capacitor connected between the main output terminal and the ground, and an auxiliary capacitor connected between the second terminal and the ground and for providing a second terminal voltage at the second terminal, and a controller; the method comprising: operating the main converter at a first frequency, operating the auxiliary converter at a second frequency which is higher than the main frequency; controlling the main converter in dependence on the second terminal voltage; and controlling the auxiliary converter to control the voltage at the main output terminal.

According to one or more embodiments, the auxiliary converter comprises a pair of switches connected in series between the second terminal voltage and the ground and having a node therebetween, and an inductor connected between the node and the output terminal, and controlling the auxiliary converter comprises constant on-time control. According to one or more such embodiments, constant on-time control comprises controlling the switches periodically to connect the inductor to the second terminal voltage for a constant "on-time", separated by an "off-time" where the inductor is connected to ground whose duration depends on an error signal and the voltage at the output terminal. In other embodiments, alternative known control schemes may be used.

According to one or more embodiments, controlling the main converter comprises: determining an error between the voltage at the second terminal and a reference auxiliary voltage, and controlling switches in the main converter to minimise the error.

According to one or more embodiments, controlling the main converter comprises determining the error by: subtracting a digitised version of the voltage at the second terminal from a digital representation of the reference auxiliary voltage and processing the result of the subtraction in a one of a proportional-integral-derivative, PID, circuit and a proportional-integral, PI, circuit to determine the error. In other embodiments, a digital representation may not be required and the processing may be carried out directly on analog signals.

The main converter may be a series-capacitor buck converter. However, the present disclosure is not limited thereto, and alternative converter architectures may be used for the main converter, as appropriate for any particular application.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read-only memory (ROM), erasable programmable read-only memory (EPROM) or electronically erasable programmable read-only memory (EEPROM), as non-limiting examples. The software implementation may be an assembly program.

The computer program may be provided on a computer readable medium, which may be a physical computer readable medium, such as a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which FIG. 1 illustrates an auxiliary converter which may be used, in conjunction with a power converter, to accommodate variations in a load;

FIG. 8 shows efficiency measurements of an example DC-DC converter as shown in FIG. 2, under various operating conditions;

Figure 2:
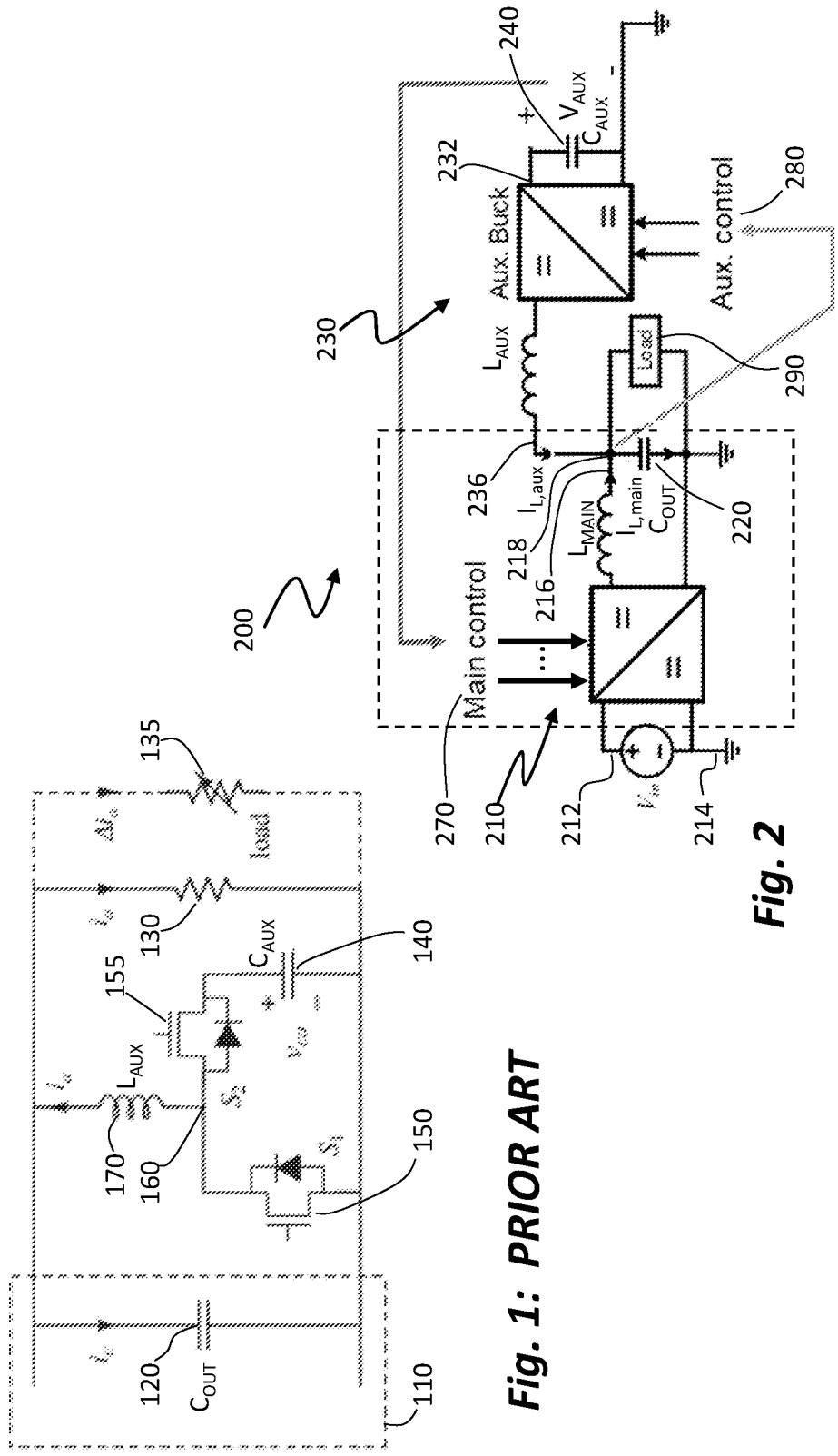
FIG. 2 illustrates a DC-DC converter including a main converter and an auxiliary converter according to one or more embodiments.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

In general terms, the present disclosure describes a control scheme for a hybrid converter including a main stage DC-DC converter and an auxiliary DC-DC converter in which the auxiliary DC-DC converter regulates the output voltage, $V_{OUT}$, while the main DC-DC stage regulates voltage across a buffer, or auxiliary, capacitor $C_{AUX}$ at the auxiliary DC-DC converter input, $V_{AUX}$. By regulating $V_{AUX}$, a low-voltage input voltage for the bidirectional auxiliary stage may be maintained and/or may be continuously controlled. This may allow using lower-voltage switches for the auxiliary converter, with a better figure of merit (FOM), to allow higher efficiency when switching at higher switching frequencies. Also, in some embodiments, other low-voltage circuits, such as gate drivers, can be supplied from this capacitor $C_{AUX}$. A concept called Extreme Adaptive Voltage Positioning (EAVP) of $V_{AUX}$ is also introduced: while a larger voltage swing can already be accommodated on $C_{AUX}$ compared to $C_{OUT}$ when load transients occur, using the scheme above, EAVP dynamically sets $V_{AUX}$ based on the load current, $I_{LOAD}$, for reduced auxiliary capacitance, $C_{AUX}$. Whereas AVP is already known, the term Extreme is used here since the voltage range, across which the capacitor voltage is controlled as a function of the load current, is much larger (typically 100 s of mV) than for state-of-the-art voltage positioning (in which the reference voltage generally does not deviate more than 10 mV), which also would be applied to $V_{OUT}$, and not to $V_{AUX}$ as in this disclosure.

Turning now to the figures, FIG. 1 illustrates the known concept of using an auxiliary converter to either source or sink currents during load transients. In particular, a main converter 110 may provide a variable current $i_c$ to charge an output capacitor $C_{OUT}$ 120. The capacitor provides current $i_o$ to a load (shown as a resistive load 130). During transient increases or decreases in the load (shown pictorially as variable load 135), an additional current $\Delta i_o$ should be supplied or removed, respectively. As shown, this additional current may be provided from a capacitor $C_{AUX}$ 140 acting as an energy store, using a converter having a half-bridge pair of switches S1 and S2 150 and 155, and an auxiliary inductor $L_{AUX}$ 170 connected between the half-bridge node 160 and the output.

FIG. 2 illustrates a converter according to a first aspect of the present disclosure. There is shown a power converter 200 having a main buck converter 210 connected between a first input voltage 212 and a ground 214 and having a main output 216 at an output terminal 218, and a bidirectional auxiliary converter 230 connected between a second terminal 232 and the ground 214 and having an auxiliary output 236 connected to the main output terminal. It will be appreciated, that as used herein, the term "second terminal", need not require an external input or output. Rather, the term is used broadly to include applications and embodiments in which the "second terminal" is connected or connectable only to the auxiliary capacitor. Moreover, in some embodiments, the second terminal may be connected or connectable to a supplementary power supply (which may be used for example to prime the auxiliary capacitor $C_{AUX}$ as further discussed herein). In other embodiments, the second terminal may be used as a supplementary output in order to provide power at the auxiliary voltage ($V_{AUX}$). This may be particularly convenient, for example to power gate drivers for the gates of the transistors in the auxiliary converter. As will become more apparent herein, there may be a "tradeoff" between, on the one hand, the tightness of the voltage regulation required or desirable on the voltage of the auxiliary capacitor $C_{AUX}$ in order that the combination of the auxiliary converter and the auxiliary capacitor may be implemented as a supplementary power supply, and on the other hand to allow the voltage on the auxiliary capacitor to swing sufficiently to provide a rapid response to transients in the load current.

The converter further comprises an output capacitor 220 connected between the main output terminal 218 and the ground 214, an auxiliary capacitor 240 connected between the second terminal 232 and the ground 214 and for providing a second terminal voltage at the second terminal, and a controller (shown in two parts in the figure). A load, such as that shown at 290, may be connected between the main output terminal and ground. The controller comprises a first control circuit (shown schematically as 270 in the figure) configured to operate the main converter, and a second control circuit (shown schematically as 280 in the figure) configured to operate the auxiliary converter. The first control circuit is further configured to operate the main converter in dependence on the second terminal voltage. In other words, the main DC-DC converter stage regulates the voltage across the auxiliary capacitor $C_{AUX}$. Furthermore, the second control circuit is further configured to operate the auxiliary converter to control the voltage at the main output terminal. In other words, the auxiliary DC-DC converter regulates the output voltage $V_{OUT}$ at the main output terminal. As shown in FIG. 2, the main converter 210 has an inductor ($L_{MAIN}$)—although they are shown separately in the figure, it is considered to be part of the main converter 210, and thus as used herein, the term "main converter" is to be interpreted broadly as including the inductor $L_{MAIN}$. Similarly, the auxiliary converter 230 has an inductor ($L_{AUX}$)—although they are shown separately in the figure, it is considered to be part of the auxiliary converter 230, and the term "auxiliary converter" is to be considered as including the inductor $L_{AUX}$.

Figure 3:
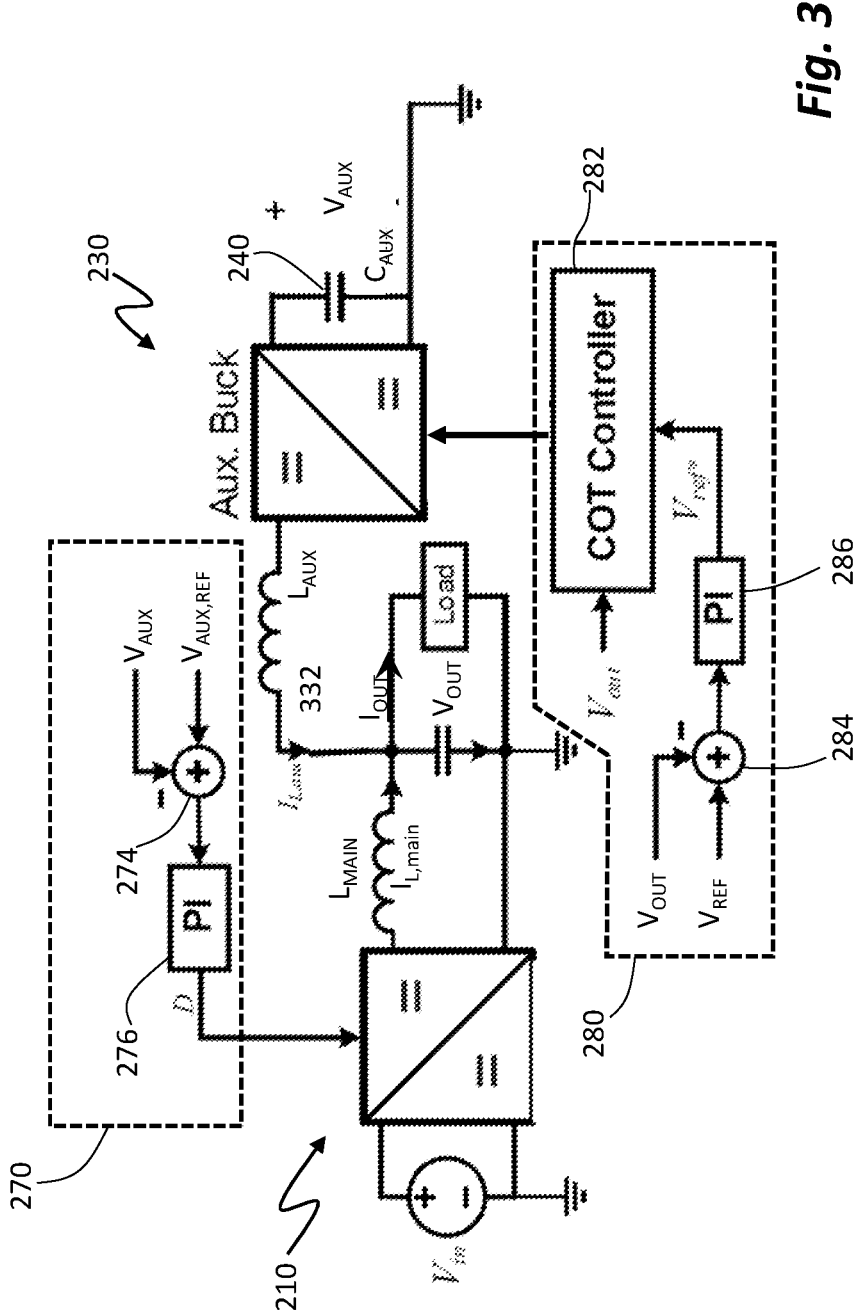
FIG. 3 illustrates a DC-DC converter such as that shown in FIG. 2 and including, schematically, a controller according to one or more embodiments.

FIG. 3 shows a converter such as that shown in FIG. 2, including more details of the controller, according to one or more embodiments. The controller comprises two parts or two control circuits 270 and 280. In operation, the main converter 210 delivers the DC or steady state load current. For optimal efficiency of the converter, it is desirable that the main converter switches at a relatively low frequency (typically in the order of 50 kHz to 500 kHz, or more particularly in a range between 100 kHz and 250 kHz). In the case that the current required by the load varies slowly, the main converter is able to respond to the change in load current. However, in the case of abrupt changes to the required currents or other transients in the load, the main converter is unable to react sufficiently quickly to avoid a dip (or spike) in the output voltage. However, the auxiliary converter which operates at a higher frequency (typically in a range of 500 kHz to 5 MHz, or more particularly in a range of 1 MHz to 2.5 MHz), is able to respond to either source or sink the additional required or excess current, in order to reduce the dip or spike in the output voltage.

As can be seen in FIG. 3, according to aspects of the present disclosure, the control of the main converter and auxiliary converter is "cross coupled"; in other words, the main converter is used to regulate a voltage $V_{AUX}$ across the auxiliary capacitor $C_{AUX}$ 240, and the auxiliary converter is used to regulate the voltage at the main output terminal $V_{OUT}$. By using the main converter to control $V_{AUX}$, replenishment of the charge drawn from, or dumped into, the auxiliary capacitor $C_{AUX}$ 240 due to transients at $V_{OUT}$ is performed at a slower pace than the charge on the output capacitor $C_{OUT}$ 220 is replenished by the auxiliary converter. As a result, the voltage across the auxiliary capacitor $C_{AUX}$ 240 changes. It will be appreciated that according to this control scheme, the swing on the auxiliary capacitor is relatively large compared to the swing on $V_{OUT}$ and it will be noted that allowing a larger voltage swing on the auxiliary capacitor $C_{AUX}$ 240 may enable a reduction in the overall capacitance (that is to say, $C_{OUT}$ and $C_{AUX}$) than would be the case if the input of the auxiliary converter were directly connected to $V_{IN}$. Furthermore, it will be noted that continuous control of $V_{AUX}$ by the main stage may allow using $V_{AUX}$ to also supply other low-voltage circuitry, without adding an additional converter to generate $V_{AUX}$, as will be discussed further, hereinbelow.

According to embodiments shown in FIG. 3, the second control circuit 280 comprises a constant on-time (COT) controller 282. When a load step up occurs, $V_{OUT}$ drops below a reference voltage level $V_{REF}$, and the COT controller of the auxiliary converter immediately controls its high-side switch to a longer on-time, thereby passing more energy through the auxiliary inductor $L_{AUX}$ 332. As a result, $V_{OUT}$ is pumped up as fast as possible by the auxiliary converter 230 to replenish the charge lost by applying the load current step. Since the auxiliary converter is supplied by $C_{AUX}$, this capacitor discharges, and $V_{AUX}$ drops. However, as already mentioned, the voltage at $V_{AUX}$ is controlled by first control circuit 270, through the main converter 210. When $V_{AUX}$ drops below an auxiliary voltage reference $V_{AUX,REF}$, the first control circuit operates the main converter to increase its output current. This current flows "back" through $L_{AUX}$ and the auxiliary converter into $C_{AUX}$ to restore (that is to say, "pump up") $V_{AUX}$. Since the main converter switches at a lower switching frequency than the auxiliary converter, replenishing $C_{AUX}$ occurs at a slower pace than replenishing $V_{OUT}$. Also, since $V_{AUX}$ is significantly higher than $V_{OUT}$, e.g. 5V compared to 0.8V, the voltage drop on $C_{AUX}$ due to a load current step on $C_{OUT}$ can be much higher than the allowed voltage variation on $C_{OUT}$, on which tight regulation of $V_{OUT}$ is required. For example, the voltage on $C_{AUX}$ could be allowed to drop from a nominal 5 V to, by several 100 s of mV (e.g to 4.7 V). in comparison, the output voltage $V_{OUT}$ across the capacitor $C_{OUT}$ should be in general relatively tightly controlled, such that typically variation of only a few tens of mV variation may be allowed. For a load current step in the downward direction, the inverse occurs. Both $V_{OUT}$ and $V_{AUX}$ will show an overshoot, where the main converter will lower its current to discharge $C_{AUX}$ again until the surplus in charge on $C_{AUX}$ has been removed. (Again, the allowable voltage variation across $C_{AUX}$ may be significantly larger than that allowed across $C_{OUT}$).

In the embodiment shown in FIG. 3, the first circuit 270 uses an error amplifier circuit comprising an subtractor 274 (to determine the difference between $V_{AUX}$ and $V_{AUX,REF}$), together with a proportional-integral circuit 276 in order to determine the error signal for controlling the main converter. Similarly, the second circuit 280 uses an error amplifier circuit comprising a subtractor 284 (to determine the difference between $V_{OUT}$ and $V_{REF}$), together with a proportional-integral (PI) circuit 286 in order to determine the error signal for controlling the COT controller for the auxiliary converter. However, the skilled person will appreciate that other control schemes may be used in one both of first control circuit 270 and second control circuit 280. In particular the PI circuit may be replaced by a PID (proportional-integral-derivative) circuit. In general, PID circuits tend to be quicker to respond compared to PI circuits, so may be preferred, in particular for the second control circuit 280 for controlling the auxiliary converter, for which a fast reaction may be desirable.

Figure 4:
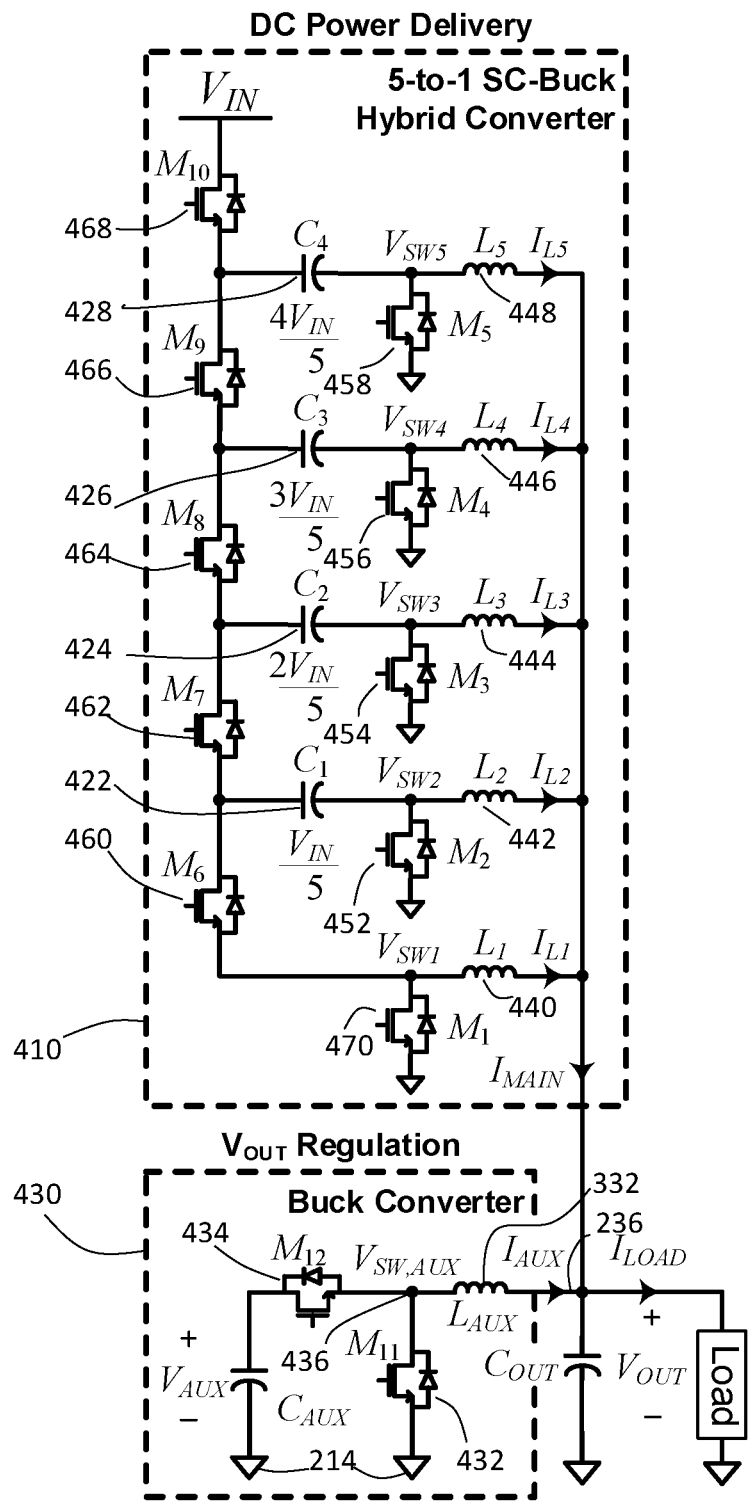
FIG. 4 illustrates an architecture for a main converter and an auxiliary converter according to one or more embodiment.

Turning now to FIG. 4, this shows an example of a main converter 210 and an auxiliary converter 230 according to one or more embodiments. The skilled person will appreciate that other converter architectures may be used for one or both of these stages. The main converter 410 illustrated in FIG. 4 is a 5-to-1 Series-Capacitor (SC) buck hybrid converter. The converter comprises a ladder arrangement, the rungs of which are four capacitors, C1 422, C2 424, C3 426, and C4 428, which are respectively connected in series with four inductors L2 442, L3 444, L4 446, and L5 448. The respective nodes between the capacitors and inductors are connectable to ground via a first group of switches M2 452, M3 454, M4 456 and M5 458. The inductor outputs are commonly connected to provide an output current $I_{MAIN}$. The capacitor inputs are connected in a ladder to input voltage $V_{IN}$ by a series arrangement of the second group of switches M7 462, M8 464, M9 466, and M10 468. A further, lowest, rung of the ladder consists of a further inductor L1 440, having its output connected to the common output, and its input directly connected to a further switch M6 460 which is connected in series before the switch series M7, M8 . . . . Finally, the node between the switch M6 460 and the inductor L1 440 is connectable to ground by a final switch M1 470.

Figure 5:
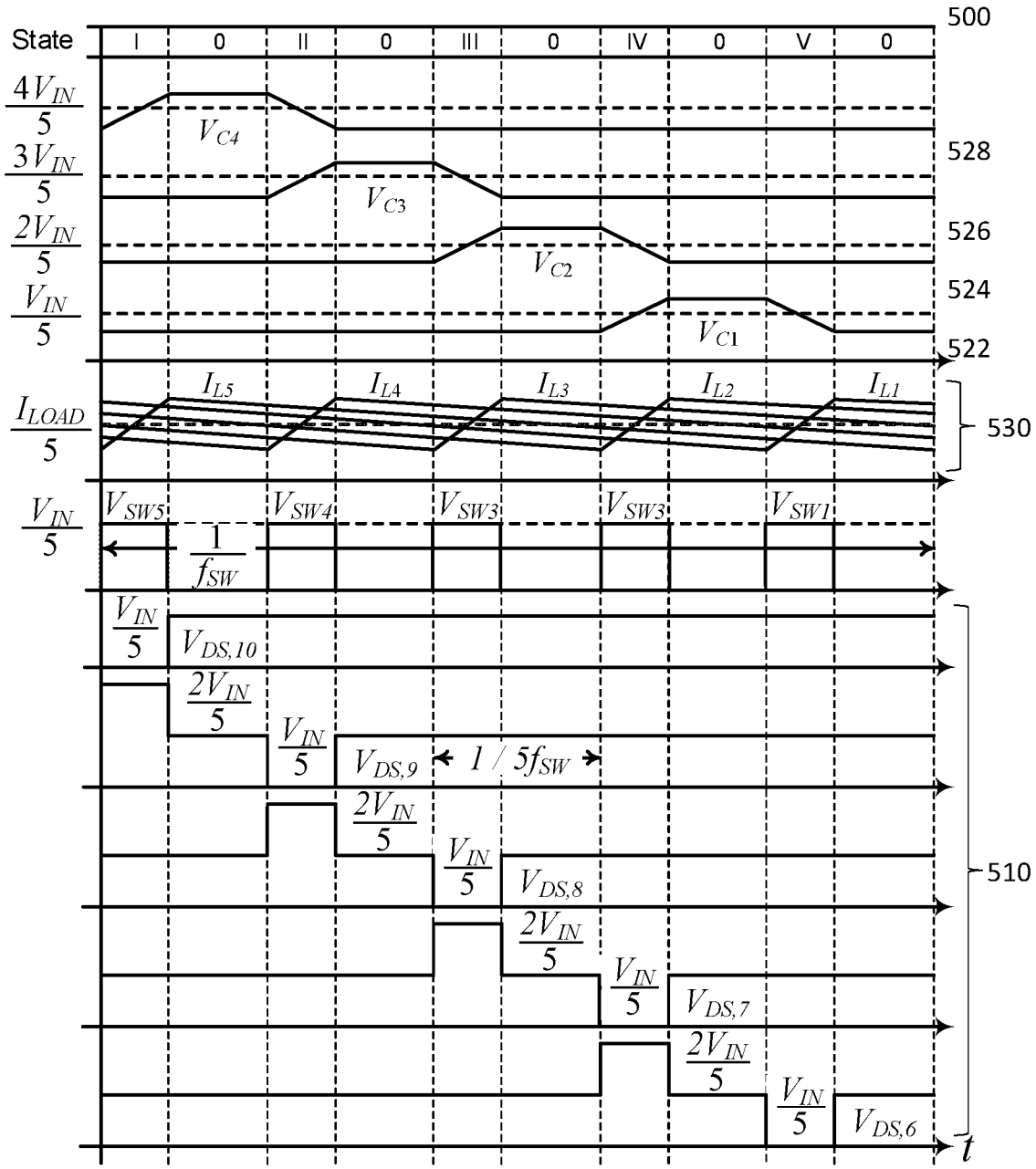
FIG. 5 shows various waveforms associated with the control of a main converter as shown in FIG. 4.

In operation, the switches are operated, shown in FIG. 5 at 510, to cycle round four "charging states" (I, II, III and IV) with a "discharge state" (state 0) therebetween, as shown at 500. This controls the voltages on capacitors C1 . . . C4 to vary, around a voltage of $V_{IN}/5$, $2V_{IN}/5$, $3V_{IN}/5$, and $4V_{IN}/5$ respectively, as shown in FIG. 5 at plots 522, 524, 526 and 528 respectively, and to sequentially load the inductors L1, L2 ... L5 to provide contributions $I_{L1}$, $I_{L2}$ ... $I_{L5}$ to the output current $I_{MAIN}$, as shown at 530.

Returning to FIG. 4, a simple half-bridge architecture is suitable for the auxiliary converter 430. According to such embodiments the auxiliary stage or converter 430 may be a bidirectional converter stage configured as a simple half bridge, having a pair of switches M11 432 and M12 434 with a switch node 436 therebetween, and an auxiliary inductor $L_{AUX}$ 332 connected between the switch node and the output node 236. As already mentioned, the auxiliary converter 430 is designed to operate at relatively high frequency in order to provide a fast response to transients.

Since there are no precise requirements on the voltage $V_{AUX}$ at the input of the auxiliary converter, the SC-buck switching frequency, $f_{sw,main}$, maybe relaxed to optimise the main stage for DC or only slowly-varying power delivery by selecting silicon devices with a low $R_{DS,on}$, for the switches M1, M2 ... M10 in the main converter. Similarly, since the steady-state average currents of the auxiliary stage is zero, it may be possible to use low-gate-charge ($Q_G$) devices for the auxiliary converter switches M11 and M12. Moreover, since the voltage on auxiliary converter is low (typically 5 V) compared to the voltage of the main converter (which in—non-limiting—automotive applications may be nominally 48 V but may often be specified so as to be allowed to vary widely, for instance between 24 and 54 V), low voltage devices may be used for switches M11 and M12, avoiding the need for relatively costly "III-V" or wideband gap materials such as GaAs or GaN.

Thus, by choosing an appropriately low $V_{AUX}$, e.g. 5V maximum, the power switches may be chosen with a significantly lower voltage rating compared to feeding $V_{AUX}$ from $V_{IN}$ directly. As a result, a high switching frequency and related transient response may be possible at an acceptable power efficiency. The faster transient response when using low-voltage switches in the auxiliary converter can, to some extent, be considered to be exchanged with a lower $C_{OUT}$ value compared to the situation where $V_{AUX}$ is fed directly from $V_{IN}$. Moreover, a much larger voltage excursion on $C_{AUX}$ (typically 100s of mV) during load current transients on $C_{OUT}$ can be tolerated compared to the voltage excursion on $C_{OUT}$ (which may typically be allowed to be no more than a few tens of mV). This means that capacitance $C_{AUX}$, both operating at higher voltage and allowing a larger voltage excursion than $C_{OUT}$, is efficiently used. Compared to known converters, this may lead to a potential reduction of the total capacitance and hence the bill-of-materials (BOM) costs. It will be appreciated that $V_{AUX}$ can also be used to supply other low-voltage circuits, such as gate drivers, since it is continuously controlled by the main converter. In general, circuits should be able to tolerate the voltage excursions on $V_{AUX}$ due to load transients on $V_{OUT}$, but in general this should not be a problem, e.g. for gate drivers 100s of mV variation should not be problematic.

Figure 6:
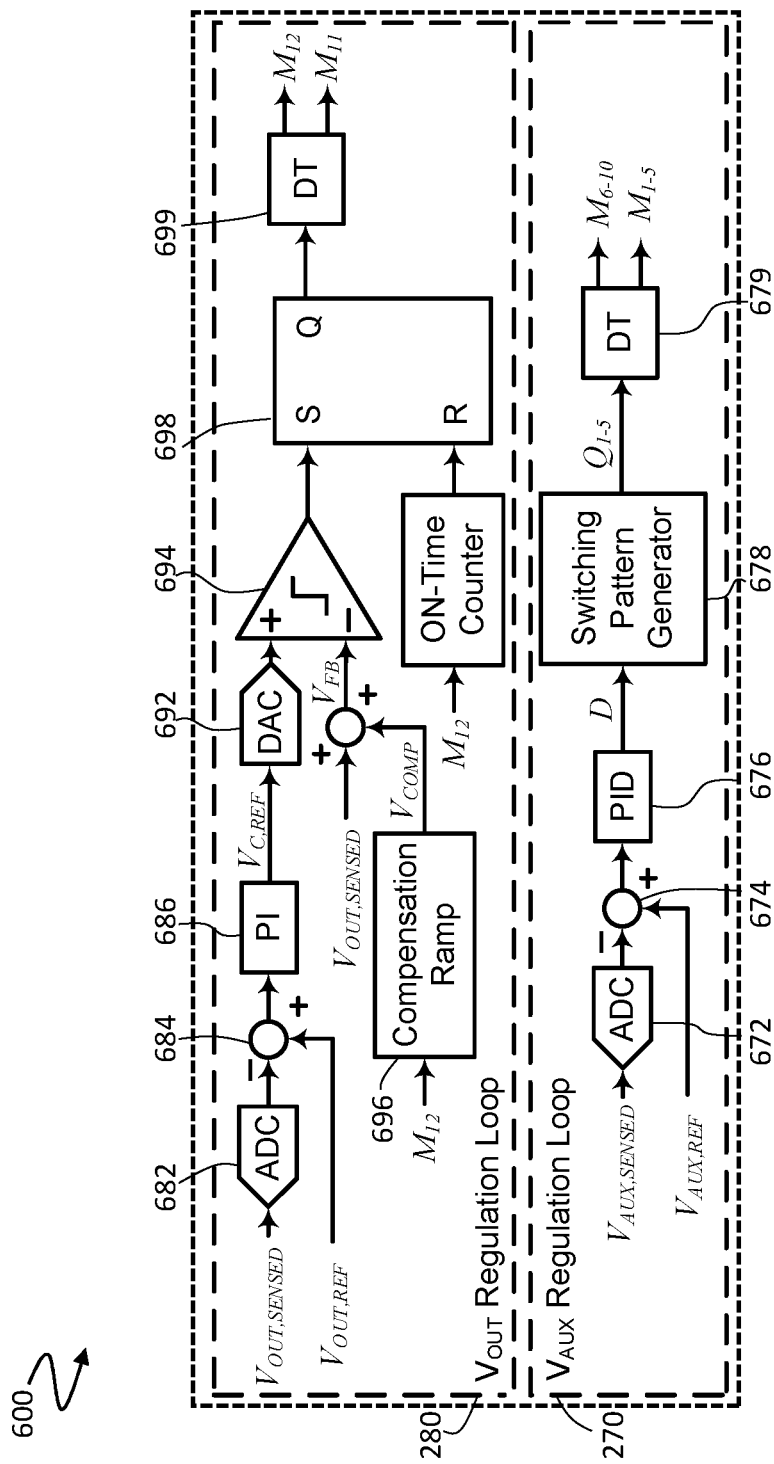
FIG. 6 shows a controller including first and second control circuit in more detail.
Figure 7:
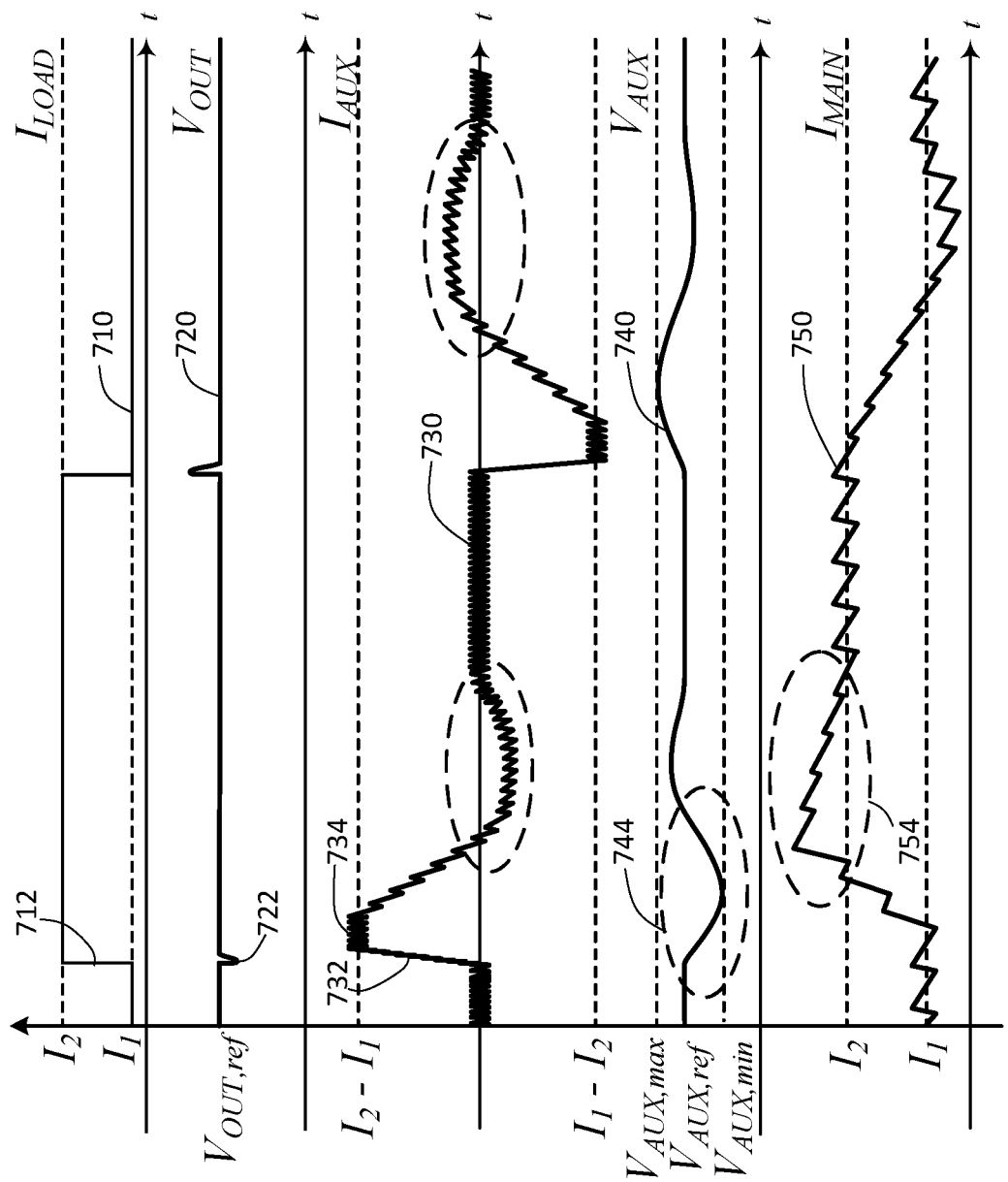
FIG. 7 shows various waveforms associated with the controller of FIG. 6 and DC-DC converter of FIG. 2.

An implementation of the control scheme outlined above with reference to FIG. 3 will now be discussed in more detail, with reference to FIG. 6. and FIG. 7. Another version of the control scheme according to other embodiments, in which adaptive voltage positioning is implemented, will be described hereinbelow with regards to FIGS. 9 and 10. FIG. 6 shows, schematically, a controller 600 which comprises the two control loops 270 and 280, and closed-loop operating waveforms of the proposed system during load transients are shown in FIG. 7. In particular, FIG. 7 shows, starting at the top and all plotted against time, the load current $I_{LOAD}$ 710, the output voltage $V_{OUT}$ at 720, the auxiliary current $I_{AUX}$ sourced or sunk by the auxiliary converter at 730, the voltage $V_{AUX}$ across the auxiliary capacitor and at the input of the auxiliary converter at 740, and the output current $I_{MAIN}$ across the load at 750. It will be appreciated that controller 600 may include other functionality in addition to the two control loops control circuits 270 and 280.

Operation is based on the interdependent operation of the two control loops, 270 and 280. It will be appreciated that, depending on the application, system stability considerations may limit the control bandwidth of each loop. First, a load step-up 712 occurs, which causes a drop 722 in $V_{OUT}$. The COT-based auxiliary converter responds to the drop in $V_{OUT}$ by quickly increasing its output current, $I_{AUX}$, to prevent further charge removal from $C_{OUT}$, a seen at 732. Although $V_{OUT}$ returns to its steady-state value, the auxiliary converter continues to provide the transient current, $I_2$-$I_1$ as seen at 734. The voltage $V_{AUX}$ across its energy reservoir—the auxiliary capacitor $C_{AUX}$—thus dips, as can be seen at 744. If left unchecked, the transient current would deplete the charge from $C_{AUX}$ and cause $V_{AUX}$ to decrease until the auxiliary converter can no longer regulate $V_{OUT}$.

Thus, a mechanism is required to ensure the charge on the auxiliary capacitor $C_{AUX}$ is replenished and $V_{OUT}$ regulation is not disrupted. With the auxiliary converter providing $V_{OUT}$ regulation, the main stage can now regulate $V_{AUX}$ to ensure $V_{OUT}$ regulation is not disrupted and the creation of an ancillary voltage. It will be noted that the main stage is not directly connected to the auxiliary capacitor $C_{AUX}$, instead the auxiliary voltage, $V_{AUX}$, is regulated through the auxiliary converter.

The following analysis shows how the main stage is capable of regulating $V_{AUX}$, in the presence of for example a non-linear COT control scheme Assuming a small duty cycle, the control-to-output transfer function for the COT-based auxiliary converter is given by:

$$a. \quad \frac{V_{out}(s)}{V_c(s)} = \frac{(1 + C_{OUT} \cdot R_C \cdot s)}{1 + \frac{s}{Q_1 \cdot \omega_1} + \frac{s^2}{\omega_1^2}},$$

where $$Q_1 = \frac{1}{\left(C_{OUT} \cdot R_C - \frac{T_{ON}}{2}\right) \pi f_{sw,aux}},$$

$$a. \quad \omega_1 = \pi f_{sw,aux},$$

$R_C$ is the equivalent series resistance of the output capacitance, and $T_{ON}$ is the on-time of the auxiliary converter. Based on the above relationships, the COT-based control scheme rejects disturbances on the output voltage for frequencies up to $0.5 \times f_{sw,aux}$. Unlike typical auxiliary converters, the auxiliary voltage, $V_{AUX}$, deviates significantly during load transients and with conventional voltage-mode or current-mode control, the impact of an input voltage disturbance on the output would be determined by the line-to-output transfer function. By using a COT control scheme, any input voltage disturbance is rejected on a cycle-by-cycle basis as the auxiliary converter off-time, $T_{OFF}$, is adjusted to control $f_{sw,aux}$. Thus, the deviation on $V_{AUX}$ does not impact the output voltage regulation of the COT-based auxiliary converter.

With the auxiliary converter providing the transient current, $I_2$-$I_1$, the main stage can sense the deviation on $V_{AUX}$ and replenishes the charge on $C_{AUX}$ by increasing its output current, $I_{MAIN}$, as seen at 754. Since $C_{AUX}$ is not directly connected to the main stage, the main stage control bandwidth should be lower than the control bandwidth of the COT control scheme to regulate $V_{AUX}$, which can readily be achieved, as the auxiliary converter is controlled at a higher frequency than the main converter. By doing so, any charge placed on the output node by the main stage is absorbed by the auxiliary converter to replenish the charge on $C_{AUX}$ and ensure $V_{OUT}$ is not disturbed. In an example (and non-limiting) implementation, the COT-control loop bandwidth is approximately 800 kHz, the main-stage switching frequency, $f_{sw,main}$, may be set to 160 kHz which ensures the main stage does not cause disturbances on $V_{OUT}$. Thus, the main-stage control-to-output transfer function is determined similar to a conventional switching regulator, which can be used to design a PID controller (or PI, as discussed above) for $V_{AUX}$ regulation.

As can be seen in FIG. 6, the first control circuit, in the form of the auxiliary voltage regulation loop (which controls the switches of the main converter) is implemented by the first circuit 270. The sensed auxiliary capacitor voltage $V_{AUX}$ (also referred to as $V_{AUX,SENSED}$) is provided as input. $V_{AUX,SENSED}$ is digitised by an analog-to-digital converter (ADC) 672 and subtracted, at 674, from a reference level $V_{AUX,REF}$, to generate an error signal which is integrated in a PID (proportional-integral-derivative) unit 676, to provide a drive signal D which is passed to a switch pattern generator 678 which outputs timing signals Q1 . . . Q5. These in turn are processed by non-overlap, or dead-time (DT), timers 679 to result in the switching controls for the switches M1, M2 . . . M10 in the 5:1 SC main converter 410. The skilled person will appreciate that non-overlap timers 679 are provided in order to avoid shoot-through current which could otherwise result from simultaneous turn-on of the switches, for instance resulting from finite slew rates of the switches.

The second control circuit, in the form of the output voltage regulation loop (which controls the switching of the auxiliary converter) is implemented by the second circuit 280. The sensed output voltage $V_{OUT}$ (also referred to $V_{OUT,SENSED}$) is digitised in an ADC 682 and then compared with a reference output voltage $V_{OUT,REF}$, in a subtracter 684, resulting in an error signal which is integrated in a PI (proportional-integral) circuit 686 to provide a signal $V_{C,REF}$. The (digital) signal is converted back to analog in DAC 692 and compared to a feedback signal $V_{FB}$ in a comparator 694. The feedback signal is derived from the output voltage $V_{OUT,SENSED}$, by adding a compensation value $V_{COMP}$ to $V_{OUT,SENSED}$, where the comp is determined by a compensation ramp 696, which is triggered by the high-side switch M12 of the auxiliary converter (in other words, it is triggered at the start of $T_{ON}$. The output from comparator 694 is provided as the set input to a SR flip-flop 698, the reset input being provided by an On-time counter triggered by M12. The output (Q) is provided to a non-overlap timer DT 699 from which the control signals for the high- and low-side switches, M12 and M11, of the auxiliary converter, are generated.

It will be noted that FIG. 6 shows parts of each of the first and second control circuit as being in the digital domain, and in particular $V_{OUT,SENSED}$, and $V_{AUX,SENSED}$ are each processed by being digitised in respective ADCs, before, at least in the case of the second control circuit, being converted back into an analog signal. However, the present disclosure is not limited to digital processing, or mixed digital and analog processing, and may include control loops which are entirely in the analog domain such that each of control circuits 270 and 280 may be entirely analog, may be mixed, or may be primarily digital.

A prototype converter, according to one or more embodiments, has been built, with the following parameters: $V_{IN}$: 24-70V, $V_{OUT}$: 0.674-0.8V, $I_{OUT}$: 62.25 A, $P_{OUT}$: 50 W, $C_{OUT}$: 720 µF, $f_{sw,main}$: 160 kHz, L1 . . . I5: 470 nH, C1 . . . C4: 10 µF, $f_{sw,aux}$: 1.6 MHz, $L_{AUX}$: 36 nH, $V_{AUX}$: 5V, $C_{AUX}$: 12 µF. The measured system efficiency (percentage) on the Y-axis versus load power (in W) on the X-axis for varying input voltage, $V_{IN}$, of such a system is shown in FIG. 8 (left-hand side). Specific the response at $V_{IN}$=24 V is shown at 810, $V_{IN}$=48 V at 820, and $V_{IN}$=70 V at 830. The system achieves a peak efficiency of 89.5% and an efficiency of 86.8% at rated output power and nominal conversion ratio of 48V-to-0.8V. As expected, the efficiency improves with lower $V_{IN}$ due to the smaller blocking voltages of the SC-buck switches. The measured system efficiency (percentage) against load power (in W) for varying $V_{OUT}$ (plotted in V) is also shown on the right-hand side, with $V_{OUT}$=0.675V shown at 840 and $V_{OUT}$=0.8V shown at 850. At $V_{OUT}$=0.675 V, a peak efficiency of 87.8% is achieved at $P_{OUT}$=17 W while an efficiency of 86.5% is achieved at $P_{OUT}$=42 W.

Figure 9:
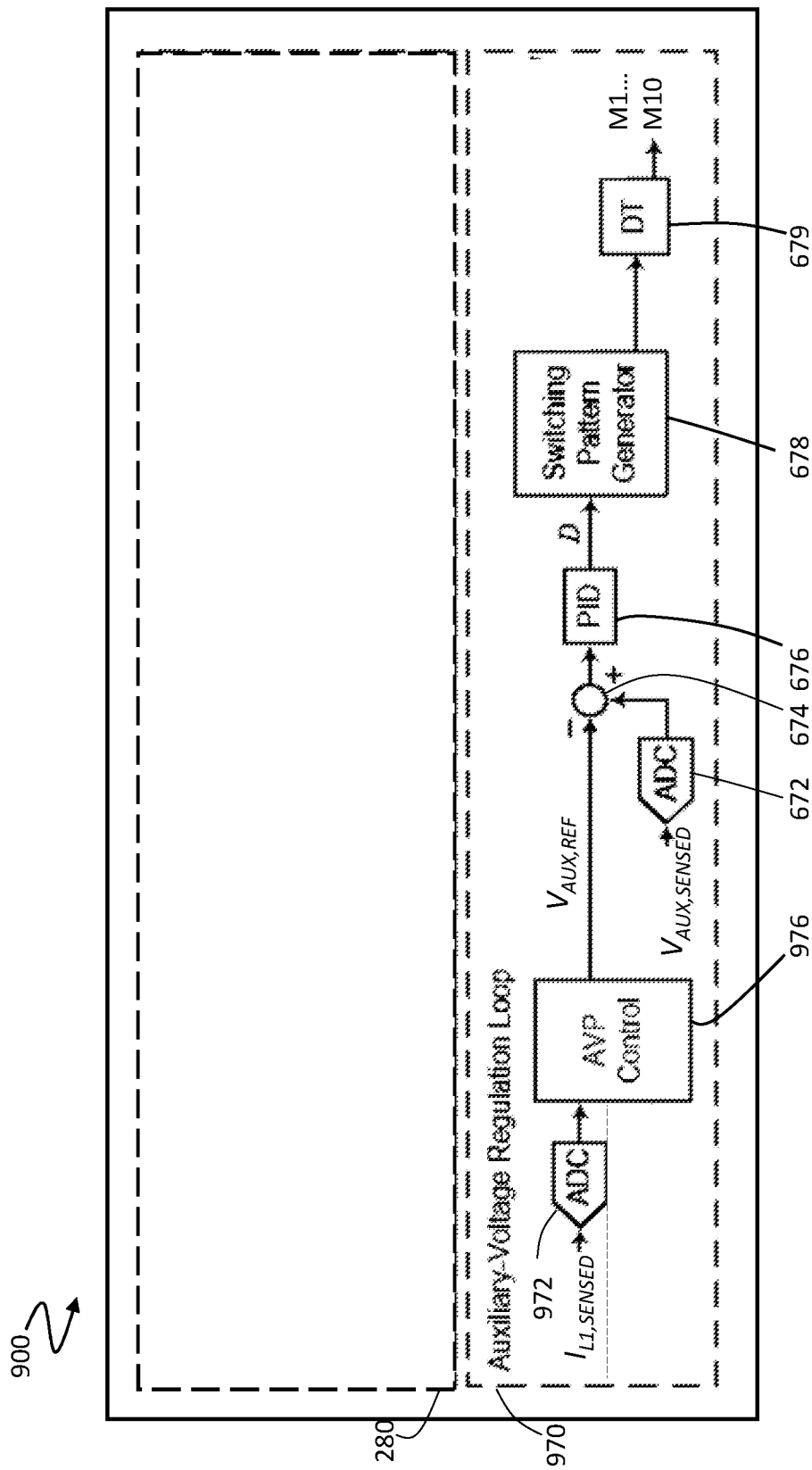
FIG. 9 shows a controller including first and second control circuit, showing a first control circuit, having AVP, in more detail.

Turning now to FIG. 9, this shows a variant of the control scheme, which may be used for embodiments of the present disclosure which implements adaptive voltage positioning. As already mentioned, adaptive-voltage-positioning control according to embodiments of the disclosure may allow the reference voltage for the control of $V_{AUX}$ to deviate further from its nominal value than is usually the case in AVP (where it is applied to $V_{OUT}$), and so the present control may alternatively be described as extreme adaptive voltage positioning. Controller 900 is similar to controller 600 in that it comprises two control circuits or control loops 280 and 970, and may include additional functionality not shown. Control loop 280 for the auxiliary converter to regulate $V_{OUT}$, by controlling the timing of switches M11 and M12, is the same as that shown for controller 600 and so will not be shown or described in detail. Control loop 970 for the main converter, to regulate $V_{AUX}$ by controlling the timing of the switches in the main converter, is similar to that described with respect to FIG. 6 in that a reference $V_{AUX,REF}$ is subtracted at subtracter 674 from a sensed value of $V_{AUX}$, that is to say $V_{AUX,SENSED}$, that is digitised in an ADC 672. The result is processed by a PID 676. Alternatively, in other embodiments the PID may be replaced by a PI circuit. The error signal output from the PID (or PI) is input to a switching pattern generator 678, the output of which is processed by non-overlap timer or timers 679 and provided as control signals to the switches M1, M2 . . . M10 in the main converter. However, in the embodiment shown in FIG. 9 the value of $V_{AUX,REF}$ is not predetermined, but determined by an AVP control subunit 976, and depends on a current from or in the main converter. In the embodiment shown, this current in the main converter is $I_{L1,SENSED}$. That is to say, it is the current in one of the inductors in the main converter, and this may be particularly convenient, since in general, it avoid the need for a shunt resistor. In other embodiments, the current $I_{MAIN}$ may be used, although as just mentioned, this may require an additional shunt resistor for measurement, with associated losses. The sensed current is digitised in ADC 972 and provided as one input to the AVP control subunit 976.

Figure 10:
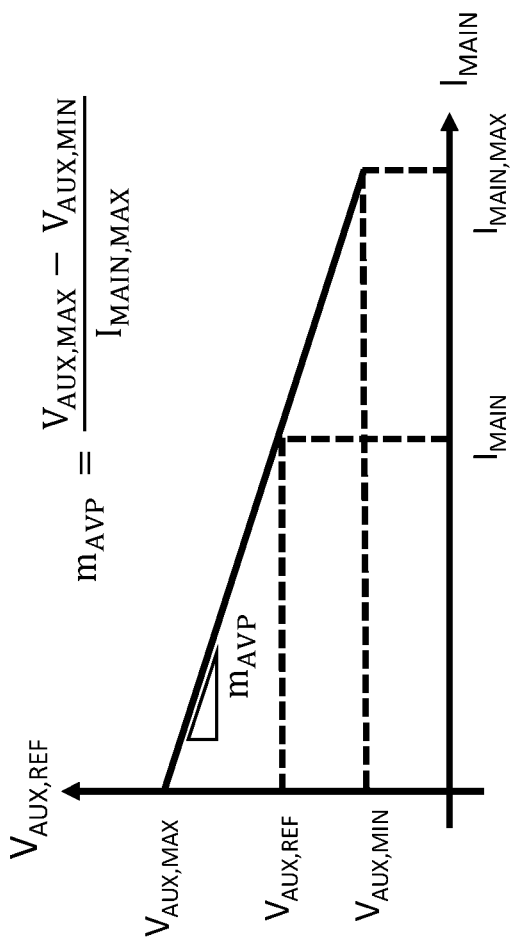
FIG. 10 shows an AVP load line.

Turning to FIG. 10, this shows, schematically, the load-line based Adaptive-Voltage-Positioning (AVP) control concept. As can be seen, the reference voltage, $V_{AUX,REF}$, lies between a minimum $V_{AUX,MIN}$, and a maximum $V_{AUX,MAX}$, depending on a supplied current from the main converter, in this case $I_{MAIN}$. The (negative) slope of this dependence, $m_{AVP}$, can then be determined, since:

$$m_{AVP} = \frac{V_{AUX,MAX} - V_{AUX,MIN}}{I_{MAIN,MAX}} \quad (4)$$

The control limits for $V_{AUX}$ (that is to say $V_{AUX,MIN}$ and $V_{AUX,MAX}$) may be set by the application. Put another way, the maximum value $V_{AUX,MAX}$, that is to say the value when there is no load on the converter, may be set to some multiple of the nominal input voltage of the auxiliary converter (for instance 1.2*(5V)=6 V, or to a specific offset, e.g. 5.5V, for a nominal 5V output auxiliary converter. Moreover, the minimum value of $V_{AUX,REF}$, when there is full load on the converter, and no additional load step is anticipate or allowed, may be set to an appropriate low value. Theoretically, the value could be as low as 0, but in practice a higher value, such as $2*V_{OUT}$, will be chosen, depending on the application. Compared to conventional uses of AVP applied to $V_{OUT}$, this allowed deviation in the reference voltage is large, so the control may be termed Extreme Adaptive-Voltage-Positioning.

The AVP circuit determines the actual value of $V_{AUX,REF}$, according to:

$$V_{AUX,REF} = V_{AUX,MAX} - m_{AVP} \cdot I_{MAIN} \quad (5)$$

An effect is that, at heavy load ($I_{MAIN} \sim I_{OUT,MAX}$), $C_{AUX}$ is nearly discharged, and so cannot source appreciable current. However, it can absorb or sink excess current delivered by the main converter, in the case of a sharp reduction in the load, minimising the spike on $V_{OUT}$. Conversely, at light load, $C_{AUX}$ is fully charged (at 6V in the above example), and when load suddenly increases, the AUX regulator can apply voltage on its inductor allowing its current to ramp quickly and supply the additional load current.

It will be appreciated that the first and second control circuit shown and described above are not the only possible control circuits, and in particular, other regulation schemes may be used, as will be familiar to the skilled person. For example, an output-capacitor current-based Hysteretic-Current Mode-Control (HCMC) scheme could be used for the second control circuit. A suitable control scheme may preferably include good supply rejection, since $V_{IN}$ can increase relatively fast during transients as $C_{AUX}$ charges, and preferably have a fast transient response. The skilled person will appreciate that there may be a "trade-off", to achieve good loop response, over good efficiency.

In order to respond quickly to load transients at the output terminal, the auxiliary converter must be able to respond, and in so, for a step-up in the load, the auxiliary converter should already have an energy reservoir in the auxiliary capacitor $C_{AUX}$. The skilled person will appreciate that at start-up, the auxiliary capacitor $C_{AUX}$ may thus require to be "primed" with an initial charge to raise $V_{AUX}$ to its nominal operating voltage. This initial change may be provided, according to some embodiments, by connecting the input to the auxiliary converter to a supplementary power supply, either permanently or temporarily. Alternatively, in other embodiments, the capacitor may be primed by the converter itself during a start-up phase during which the bidirectional auxiliary converter operates to sink a current from the output terminal (and across $C_{OUT}$) to charge the auxiliary capacitor $C_{AUX}$.

The phrase "operated at a frequency" as used herein does not constrain the control to operation at a specific or fixed frequency. In particular the converter control is not constrained to fixed frequency, or PWM, control. Rather, the phrase is to be interpreted broadly as indicating a frequency (or range of frequencies), indicative of the switching, such as "about 1 MHz", or "about 50 kHz".

Further, although it will be appreciated that, to achieve maximum benefit the auxiliary converter needs to remain operational since it controls the output voltage, the switching frequency may be variable. For example, based on information of the oncoming transients, the switching frequency of the auxiliary converter could potentially be lowered or even halted when no significant load transients are expected to optimize overall system efficiency further.

It will be appreciated that the present disclosure is not limited to automotive applications. Embodiments may in particular be useful for tailored towards other applications, particularly those in which a DC-DC conversion operation is required from an input voltage which is allowed to vary significantly. These include but are not limited to battery-powered applications and applications resulting from varying non-electrical energy source (such as wind, hydro, and the like).

From reading the present disclosure, other variations and modifications will be apparent to the skilled person. Such variations and modifications may involve equivalent and other features which are already known in the art of DC-DC converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

It is noted that one or more embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Features which are described in the context of separate embodiments may also be provided in combination in a single embodiment. Conversely, various features which are, for brevity, described in the context of a single embodiment, may also be provided separately or in any suitable sub-combination.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

LIST OF REFERENCE SIGNS 110 main converter
120 output capacitor $C_{OUT}$
130 load
135 variable load
140 capacitor $C_{AUX}$
150, 155 switch
160 half-bridge node
170 auxiliary inductor $L_{AUX}$
200 power converter
210 main buck converter
212 first input voltage
214 ground
216 main output
218 output terminals
220 output capacitor
230 bidirectional auxiliary converter
232 second terminal
236 auxiliary output
240 auxiliary capacitor
270 first control circuit
274 subtracter
276 proportional-integral circuit
280 second control circuit
290 load
323 output inductor $L_{MAIN}$
332 auxiliary inductor $L_{AUX}$
410 main converter
422 . . . 428 capacitors C1 . . . C4
430 auxiliary converter
432, 434 switches M11, M12
436 switch node
440 inductor L1
442 . . . 448 inductors L2 . . . L5
452 . . . 458 switches M2 . . . M5
462 . . . 468 switches M7 . . . M 10
470 switch M1
500 states
510 switch operation
522 . . . 528 voltage on C1 . . . C4
530 output current contributions $I_{L1}$, $I_{L2}$ . . . $I_{L5}$
672 ADC
674 subtracter
676 PID units
678 switch pattern generator
679 non-overlap timers
682 ADC
684 subtracter
686 PI circuit
692 DAC
694 latch
696 compensation ramp
698 SR flip-flop
699 non-overlap timers
710 load current $I_{LOAD}$
712 load step-up
720 output voltage $V_{OUT}$
722 drop in $V_{OUT}$
730 auxiliary current $I_{AUX}$
732 increase in output current, $I_{AUX}$
734 transient current I2-I1
740 voltage $V_{AUX}$
744 auxiliary capacitor $C_{AUX}$ dip
750 output current $I_{MAIN}$
754 increase in output current $I_{MAIN}$
810 Efficiency v Load plot at $V_{IN}$=24 V
820 Efficiency v Load plot at $V_{IN}$=48 V
830 Efficiency v Load plot at $V_{IN}$=70 V
840 Efficiency v Load plot at $V_{OUT}$=0.675 V
850 Efficiency v Load plot at $V_{OUT}$=0.8 V
900 controller
970 second control circuit
976 AVP Control

What is claimed is:

1. A controller for a power converter having a main buck converter connected between a first input voltage and a ground and having a main output at an output terminal, a bidirectional auxiliary converter connected between a second terminal and the ground and having an auxiliary output connected to the main output terminal, an output capacitor connected between the main output terminal and the ground, and an auxiliary capacitor connected between the second terminal and the ground and for providing a second terminal voltage at the second terminal;
the controller comprising:
a first control circuit configured to operate the main converter at a first frequency,
a second control circuit configured to operate the auxiliary converter at a second frequency which is higher than the first frequency;
the first control circuit being further configured to operate the main converter in dependence on the second terminal voltage; and
the second control circuit being further configured to operate the auxiliary converter to control the voltage at the main output terminal; and
wherein:
the main converter is controllable to provide a required power up to a first power level, and
the auxiliary converter is controllable to supply and absorb a second power level, which is no more than one half of the first power level, in response to a change in the required power.

2. The controller of claim 1, wherein the first control circuit is configured to:
determine an error between the voltage at the second terminal ($V_{AUX,SENSED}$) and a reference auxiliary voltage ($V_{AUX,REF}$),
and control switches in the main converter to minimise the error.

3. The controller of claim 2, wherein the first control circuit: comprises a one of a proportional-integral, PI, circuit and a proportional-integral-derivative, PID, circuit; and is configured to determine the error, by subtracting the voltage at the second terminal ($V_{AUX,SENSED}$) from the reference auxiliary voltage ($V_{AUX,REF}$), and processing the result of the subtraction in the one of the PI circuit and the PID circuit to determine the error.

4. The controller of claim 3, wherein the first control circuit is further configured to adapt the reference auxiliary voltage in dependence on an output current supplied at the main output terminal.

5. The controller of claim 1, wherein, the first control circuit controls switches in the main circuit to respectively increase and decrease the second terminal voltage, in response to the second control circuit controlling the switches in the auxiliary converter to transfer charge respectively out of, and into, the auxiliary capacitor.

6. The controller of claim 1, wherein the second control circuit is configured to compare the voltage at the main output terminal with a reference voltage.

7. The controller of claim 1, wherein second control circuit comprises a proportional-integral, PI, circuit.

8. The controller of claim 1, wherein the bidirectional auxiliary converter comprises a pair of switches connected in series between the second terminal voltage and the ground and having a node therebetween, and an inductor connected between the node and the output terminal.

9. The controller of claim 1, further configured to control the second terminal voltage within a range of +4.5 to +5.5 V.

10. The controller of claim 1, wherein the main converter is a series-capacitor buck converter.

11. The power converter of claim 1, wherein the second terminal voltage is no more than 5.5 V.

12. A method of controlling a power converter having a main buck converter connected between a first input voltage and a ground and having a main output at an output terminal, a bidirectional auxiliary converter connected between a second terminal and the ground and having an auxiliary output to the main output terminal, an output capacitor connected between the main output terminal and the ground, and an auxiliary capacitor connected between the second terminal and the ground and for providing a second terminal voltage at the second terminal, and a controller;

the method comprising:
operating the main converter at a first frequency,
operating the auxiliary converter at a second frequency which is higher than the main frequency;
controlling the main converter in dependence on the second terminal voltage to provide a required power up to a first power level; and
controlling the auxiliary converter to control the voltage at the main output terminal, wherein the auxiliary converter is controllable to supply a second power level, which is no more than one half of the first power level, in response to a change in the required power.

13. The method of claim 12, wherein controlling the main converter comprises:
determining an error between the voltage at the second terminal and a reference auxiliary voltage, and
controlling switches in the main converter to minimise the error.

14. A method of controlling a power converter having a main buck converter connected between a first input voltage and a ground and having a main output at an output terminal, a bidirectional auxiliary converter connected between a second terminal and the ground and having an auxiliary output to the main output terminal, an output capacitor connected between the main output terminal and the ground, and an auxiliary capacitor connected between the second terminal and the ground and for providing a second terminal voltage at the second terminal, and a controller;

the method comprising:
operating the main converter at a first frequency,
operating the auxiliary converter at a second frequency which is higher than the main frequency;
controlling the main converter in dependence on the second terminal voltage to provide a power supply up to a first power level; and
controlling the auxiliary converter to control the voltage at the main output terminal, wherein the auxiliary converter is controllable to supply a second power level, which is less than or equal to one half of the first power level.

15. The method of claim 14, wherein the auxiliary converter comprises a pair of switches connected in series between the second terminal voltage and the ground and having a node therebetween, and an inductor connected between the node and the output terminal, and controlling the auxiliary converter comprises constant on-time control.

16. The method of claim 14, wherein controlling the main converter comprises:
determining an error between the voltage at the second terminal and a reference auxiliary voltage, and
controlling switches in the main converter to minimise the error.

17. The method of claim 16, wherein controlling the main converter comprises determining the error by:
subtracting the voltage at the second terminal from the reference auxiliary voltage and
processing a result of the subtraction in a one of a proportional-integral-derivative, PID, circuit and a proportional-integral, PI, circuit to determine the error.

18. The method of any of claim 14 wherein the main converter is a series-capacitor buck converter.

* * * * *